United States Patent
Muralidhar et al.

(10) Patent No.: US 9,141,179 B2
(45) Date of Patent: Sep. 22, 2015

(54) FINE GRAINED POWER MANAGEMENT IN VIRTUALIZED MOBILE PLATFORMS

(75) Inventors: Rajeev D. Muralidhar, Bangalore (IN); Harinarayanan Seshadri, Bangalore (IN); Srividya Karumuri, Bangalore (IN); Nithish Mahalingam, Tamilnadu (IN); Vishwesh M. Rudramuni, Bangalore (IN); Sujith Thomas, Bangalore (IN); Rushikesh S. Kadam, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 682 days.

(21) Appl. No.: 12/975,920

(22) Filed: Dec. 22, 2010

(65) Prior Publication Data

US 2012/0102348 A1 Apr. 26, 2012

(30) Foreign Application Priority Data

Oct. 21, 2010 (IN) .............................. 2508DEL2010

(51) Int. Cl.
*G06F 1/32* (2006.01)
(52) U.S. Cl.
CPC ........... *G06F 1/3287* (2013.01); *Y02B 60/1282* (2013.01); *Y02B 60/32* (2013.01)
(58) Field of Classification Search
CPC ....... G06F 1/32; G06F 1/3287; G06F 1/3203; G06F 1/3206; G06F 1/3234; G06F 1/324; G06F 1/3296; G06F 9/45558; G06F 9/45533
USPC ................ 713/300–324; 718/1, 104
See application file for complete search history.

(56) References Cited

U.S. PATENT DOCUMENTS

| | | | |
|---|---|---|---|
| 7,127,625 B2 | 10/2006 | Farkas et al. | |
| 7,225,441 B2 | 5/2007 | Kozuch et al. | |
| 2002/0124194 A1 | 9/2002 | Dawkins et al. | |
| 2005/0268078 A1* | 12/2005 | Zimmer et al. | 713/1 |
| 2007/0192641 A1* | 8/2007 | Nagendra et al. | 713/320 |
| 2008/0005599 A1 | 1/2008 | Theocharous et al. | |
| 2008/0313483 A1 | 12/2008 | Pasupuleti et al. | |

(Continued)

FOREIGN PATENT DOCUMENTS

| | | |
|---|---|---|
| CN | 101477399 A | 7/2009 |
| CN | 200810189708 A | 7/2009 |

(Continued)

OTHER PUBLICATIONS

Hewlett-Packard et al., Advanced Configuration and Power Interface Specification, Revision 4.0a, Apr. 5, 2010, p. 43.*

(Continued)

*Primary Examiner* — Dennis M Butler
(74) *Attorney, Agent, or Firm* — Jordan IP Law, LLC

(57) ABSTRACT

A system and method of managing power may include determining a power state based on a first power management request from a first operating system executing on a mobile platform and a second power management request from a second operating system executing on the mobile platform. The first operating system and one or more components of the mobile platform can define a first virtual machine, and the second operating system and one or more components of the mobile platform can define a second virtual machine. In addition, the power state may be applied to the mobile platform.

24 Claims, 2 Drawing Sheets

(56) References Cited

U.S. PATENT DOCUMENTS

| | | | |
|---|---|---|---|
| 2010/0174924 A1* | 7/2010 | Banga et al. ................ | 713/300 |
| 2011/0055830 A1* | 3/2011 | Kamay et al. .................. | 718/1 |
| 2012/0102348 A1 | 4/2012 | Muralidhar et al. | |

FOREIGN PATENT DOCUMENTS

| | | | |
|---|---|---|---|
| JP | 2006113767 A | 4/2006 |
| JP | 3887314 B2 | 2/2007 |
| TW | 201222215 A | 6/2012 |
| WO | 2012054746 A2 | 4/2012 |
| WO | 2012/054746 A3 | 6/2012 |

OTHER PUBLICATIONS

Muralidhar, Rajiv D., et al., "Fine Grained Power Management in Virtualized Mobile Platforms", International Search Report and Written Opinion received for PCT Application Serial No. PCT/US2011/057128, mailed May 10, 2012, 8 pages.

Nathuji, et al., "Virtual Power: Coordinated Power Management in Virtualized Enterprise Systems", Proceedings of twenty-first ACM SIGOPS Symposium on Operating Systems Principles, ISBN: 978-1-59593-591-5, Oct. 14-17, 2007, 14 pages.

International Preliminary Report on Patentability received for PCT Patent Application No. PCT/US2011/057128, mailed on May 2, 2013, 5 pages.

Japanese Office Action dated Apr. 1, 2014 from Japanese Patent Application No. 2013-535096, 6 pages, including 3 pages of English translation.

Chinese Office Action dated Apr. 21, 2014 from Chinese Patent Application No. 201180002786.5, 30 pages, including 19 pages of English translation.

Chinese Office Action dated Nov. 5, 2014 from Chinese Patent Application No. 201180002786.5, 23 pages of English translation.

* cited by examiner

FINE GRAINED POWER MANAGEMENT IN VIRTUALIZED MOBILE PLATFORMS

BACKGROUND

1. Technical Field

Embodiments generally relate to virtualization technology (VT). More particularly, embodiments relate to fine grained power management in virtualized mobile platforms.

2. Discussion

As the popularity of mobile phones increases, the complexity and functionality of these devices may also increase. For example, a given mobile platform might no longer be limited to a single operating system (OS) and could support diverse usage models such as web browsing and telecommunications. While virtualization of devices with multiple operating systems may make it easier for phone vendors, software and service providers to provision the devices in customized ways, a number of challenges remain. For example, power management decisions that are relevant within a single OS may not be relevant or accurate considering a VM (virtual machine)-based device as a whole, since there can be conflicting power management requests/decisions from different operating systems.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may provide for a method in which a power state is determined based on a first power management request from a first operating system (OS) executing on a mobile platform and a second OS executing on the mobile platform. The first OS and one or more components of the mobile platform can define a first virtual machine (VM), where the second OS and one or more components of the mobile platform can define a second VM. The method may also provide for applying the power state to the mobile platform.

Other embodiments may include an apparatus having virtual machine management (VMM) logic to determine a power state based on a first power management request from a first OS that is to execute on a mobile platform and a second power management request from a second OS that is to execute on the mobile platform. The first OS and one or more components of the mobile platform may define a first VM, and the second OS and one or more components of the mobile platform may define a second VM. The VMM logic may also apply the power state to the mobile platform.

In addition, embodiments may include a system including a mobile platform to execute a first OS and a second OS, wherein the first OS and one or more components of the mobile platform define a first VM. The second OS and one or more components of the mobile platform may define a second VM. The system can also include VMM logic to determine a power state based on a first power management request from the first OS and a second power management request from the second OS. The VMM logic may also apply the power state to the mobile platform.

Other embodiments may provide for a computer readable storage medium including a set of instructions which, if executed, cause a mobile platform to determine a power state based on a first power management request from a first OS that is to execute on the mobile platform and a second power management request from a second OS that is to execute on the mobile platform. The first OS and one or more components of the mobile platform may define a first VM, whereas the second OS and one or more components of the mobile platform may define a second VM. The instructions can also provide for application of the power state to the platform.

Figure 1:
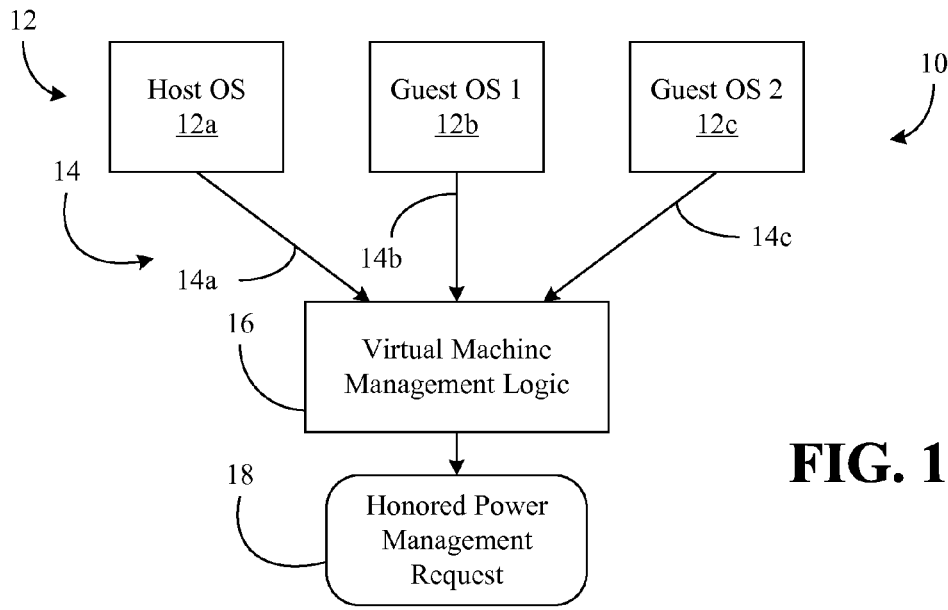
FIG. 1 is a block diagram of an example of a power management virtualization scheme according to an embodiment.

Turning now to FIG. 1, a scheme 10 of managing power in a virtualized mobile platform is shown. In the illustrated example, a plurality of operating systems 12 (12a-12c) execute on a platform to provide a wide variety of functionality. For example a host OS 12a might constitute a closed telephony stack configured to support off-platform wireless communication (e.g., W-CDMA (UMTS), CDMA2000 (IS-856/IS-2000), etc.), while a guest OS 12b might provide desktop functionality (e.g., Windows® 7), and so on. Generally, each OS 12 and one or more components of the mobile platform can define a virtual machine.

In addition, the operating systems 12 may be capable of performing enhanced dynamic/run-time power management control of peripherals and other platform components. Thus, each OS 12 may issue a power management decision/request 14 (14a-14c, e.g., via software drivers) to reduce power consumption and extend battery life for the mobile platform. For example, the power management requests 14 may relate to device power states, processor power states, platform power states, device performance states, etc. (see, e.g., Advanced Configuration and Power Interface Specification, Rev. 4.0, Jun. 16, 2009).

The illustrated scheme 10 also includes virtual machine management (VMM) logic 16 to evaluate the requests 14 and determine which power management request to honor based on platform-wide considerations such as global relevance and compatibility, wherein the honored power management request 18 can identify a power state. In the case of a device driver-coordinated power state change, a requested device power state might place an individual system on chip (SoC) hardware block (e.g., power island) such as a wireless, storage, or imaging circuit block in a low power mode during periods of inactivity. Thus, an OS device driver might decide to power down the device to the D3 power state, or power it back up to the D0 state. The OS power management layer (OSPM) may indicate such a request to the VMM logic 16, which could then make a globally relevant decision—to either accept the request and allow the device to be powered down, or to reject the request if some other guest OS is currently using the device.

For example, if host OS 12a requests device power state Dx and performance state Px, guest OS 12b requests device power state Dx1 and performance state Px1, and guest OS 12c requests device power state Dx2 and performance state Px2, the VMM logic 16 could conduct the following analysis, $$Dx3 = \text{Min}(Dx2, Dx1, Dx) \text{ at instant } t \quad (1)$$

$$Px3 = \text{Min}(Px2, Px1, Px) \text{ at instant } t \quad (2)$$

where the honored power management request 18 can identify the device power state Dx3 and performance state Px3. Thus, the illustrated VMM logic 16 selects the shallowest power state and applies it to the mobile platform in real-time.

As already noted, the VMM logic 16 may also facilitate performance state and other power state transitions such as processor power state transitions and platform power state transitions. For example, the scheme 10 may call for platform wide active idle states (e.g., S0ix), which could be low latency standby states that are employed if the platform is idle. In such a case, the VMM logic 16 could detect platform wide idleness based on idleness detection within each OS 12, and guide the entire SoC into the low power idle standby state when appropriate. Such an approach may be particularly advantageous if one or more of the guest operating systems do not have platform wide idle detection logic.

Figure 2:
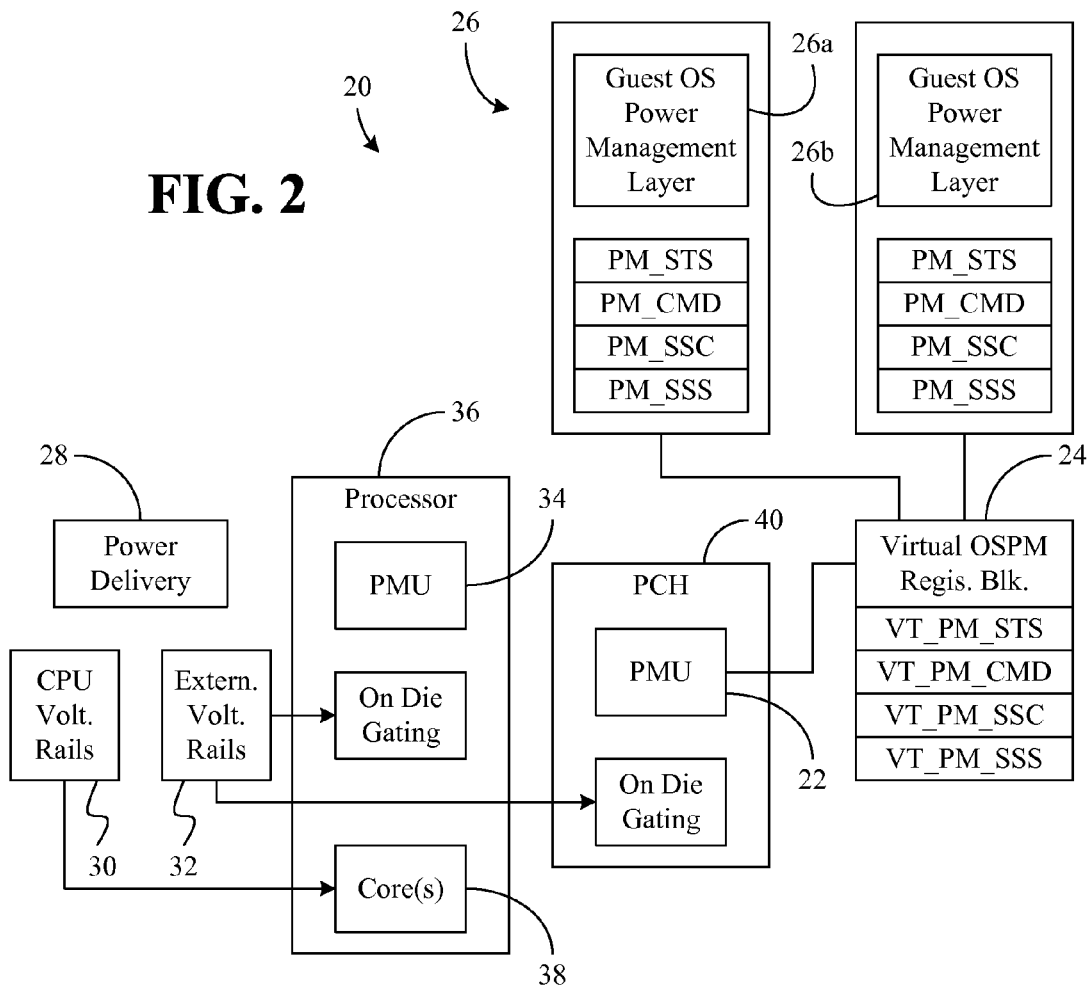
FIG. 2 is a block diagram of an example of a power management architecture having a virtualization co-processor according to an embodiment.

FIG. 2 shows an architecture 20 in which the VMM logic 16 (FIG. 1) is implemented as a virtualization co-processor having a power management unit (PMU) 22 that uses a set of memory mapped registers 24 to evaluate power management requests from OS power management layers (OSPMs) 26 (26a, 26b), wherein the registers 24 are dedicated to power management. The registers 24 may reside anywhere in the architecture 20 as appropriate. In particular, the illustrated architecture includes a mixed signal integrated circuit (MSIC) power delivery module 28 that generates central processing unit (CPU) voltage rails 30 and external voltage rails 32. The CPU voltage rails 30 can be supplied to one or more cores 38 of a processor 36, and the external voltage rails 32 can be supplied to various other hardware blocks on the processor 36 and a platform controller hub (PCH) 40. A PMU 34 of the processor 36 may perform on die clock and/or power gating of the hardware blocks of the processor 36, whereas the PMU 22 of the PCH 40 can perform on die clock and/or power gating of the hardware blocks of the PCH 40.

The PCH 40 can expose the memory mapped registers 24 to the OSPMs 26, which can write power management related data to the registers 24 in real-time. In the illustrated example, the registers 24 include a status register (VT_PM_STS), a command register (VT_PM_CMD), a subsystem control register (VT_PM_SSC) and a subsystem status register (VT_PM_SSS). Thus, OSPMs 26 might write respective power management requests (e.g., request to transition a device from D0 to D3) to the command and control registers, and the PMU 22 can read the contents of the registers 24 in making platform wide power management decisions in the virtualized environment. In addition, the PMU 22 could report the results of the platform wide determination by writing to the status registers, wherein the OSPMs 26 can read the contents of the registers 24 to determine the results.

Figure 3:
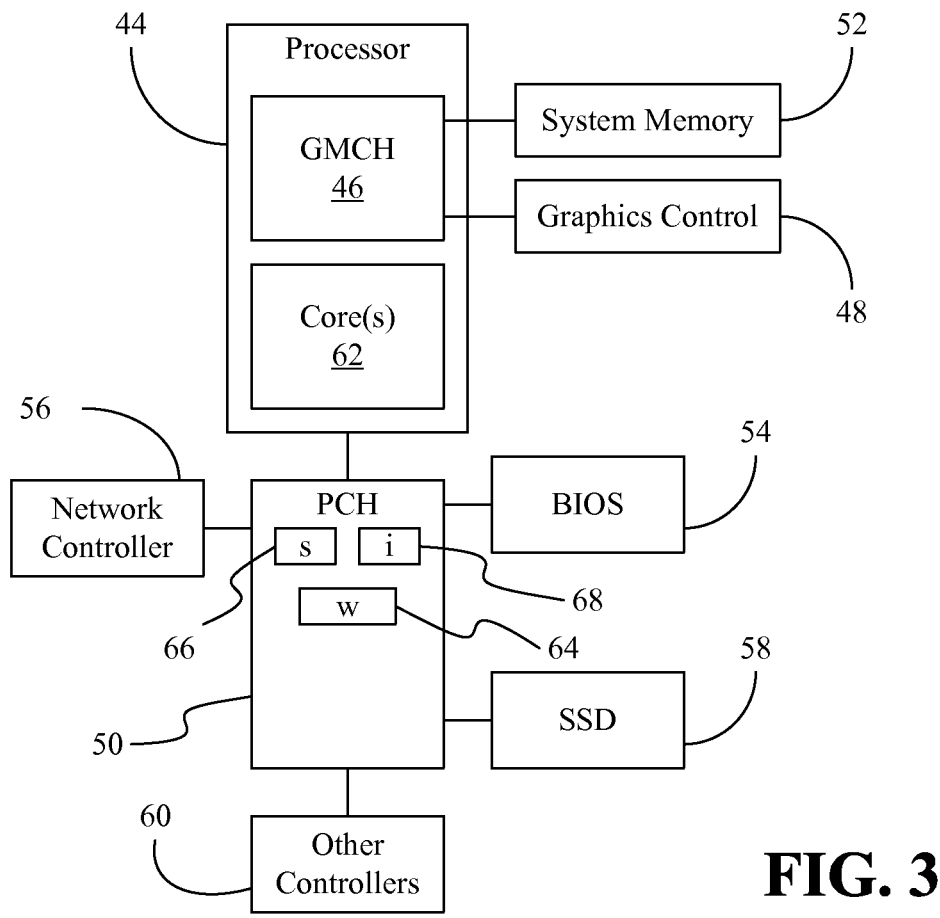
FIG. 3 is a block diagram of an example of a mobile platform according to an embodiment.

Turning now to FIG. 3, a virtualized system 42 is shown. The system 42 may be part of a mobile platform with computing functionality (e.g., personal digital assistant/PDA, laptop), communications functionality (e.g., wireless smart phone), imaging functionality, media playing functionality, or any combination thereof (e.g., mobile Internet device/MID). In the illustrated example, the system 42 includes a processor 44, a graphics memory controller hub (GMCH) 46, a graphics controller 48, a platform controller hub (PCH) 50, system memory 52, basic input/output system (BIOS) memory 54, a network controller 56, a solid state disk (SSD) 58 and one or more other controllers 60. The processor 44, which may include a core region with one or several processor cores 62, may be able to enter its cores 62 into one or more active and/or idle states based on performance and/or power management concerns, as already noted.

The illustrated processor 44 is integrated with the GMCH 46 onto a common system on chip (SoC). Alternatively, the processor 44 could communicate with the GMCH 46 over an interface such as a front side bus (FSB), a point-to-point interconnect fabric, or any other suitable interface. The GMCH 46, sometimes referred to a Northbridge or North Complex of a chipset, can communicate with the system memory 52 via a memory bus, wherein the system memory 52 might include dynamic random access memory (DRAM) modules that could be incorporated into a single inline memory module (SIMM), dual inline memory module (DIMM), small outline DIMM (SODIMM), and so on.

The GMCH 46 may also communicate with the graphics controller 48 via a graphics bus such as a PCI Express Graphics (PEG, e.g., Peripheral Components Interconnect/PCI Express x16 Graphics 150W-ATX Specification 1.0, PCI Special Interest Group) bus, or Accelerated Graphics Port (e.g., AGP V3.0 Interface Specification, September 2002) bus. The processor 44 may also communicate with the PCH 50 over a hub bus. In one embodiment, the hub bus is a DMI (Direct Media Interface) bus. The PCH 50 could also be incorporated with the processor 44 and GMCH 46 onto a common SoC.

The illustrated PCH 50, sometimes referred to as a Southbridge or South Complex of a chipset, functions as a host device and communicates with the network controller 56, which could provide off-platform communication functionality for a wide variety of purposes such as cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. The PCH 50 may also include one or more wireless hardware circuit blocks 64 to support such functionality.

The SSD 58 may include one or more NAND chips and might be used to provide high capacity data storage and/or a significant amount of parallelism. There may also be solutions that include NAND controllers implemented as separate application specific integrated circuit (ASIC) controllers being connected to the PCH 50 on standard buses such as a Serial ATA (SATA, e.g., SATA Rev. 3.0 Specification, May 27, 2009, SATA International Organization/SATA-IO) bus, or a PCI Express Graphics (PEG, e.g., Peripheral Components Interconnect/PCI Express x16 Graphics 150W-ATX Specification 1.0, PCI Special Interest Group) bus. Accordingly, the SSD 58 may be configured to communicate with one or more storage circuit blocks 66 of the PCH 50 according to a protocol such as the Open NAND Flash Interface (e.g., ONFI Specification, Rev. 2.2, Oct. 7, 2009) protocol, or other suitable protocol. The SSD 58 could also be used as a USB (Universal Serial Bus, e.g., USB Specification 2.0, USB Implementers Forum) flash storage device.

The other controllers 60 could communicate with the PCH 50 to provide support for imaging devices as well as user interface devices such as a display, keypad, mouse, etc. in order to allow a user to interact with and perceive information from the system 10. In the case of an imaging device, the PCH 50 might include one or more imaging circuit blocks 68 to support such functionality.

The system 42 may execute a plurality of operating systems, wherein each OS and one or more components of the system 42 define a VM. In addition, each OS could include an OSPM that is capable of making power management decisions for devices, cores and/or the system 42 as a whole, and submitting these decisions to VMM logic as power management requests. As already noted, the VMM logic can evaluate the power management requests and make appropriate decisions taking into consideration platform wide concerns. For example, the VMM logic could place one or more of the hardware blocks 64, 66, 68 in a low power mode corresponding to the power state of the honored power management request 18 (FIG. 1).

Figure 4:
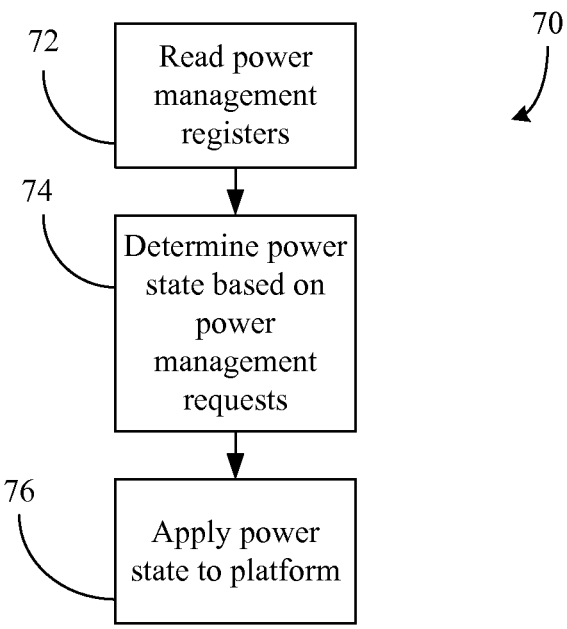
FIG. 4 is a flowchart of an example of a method of managing power in a mobile platform according to an embodiment.

FIG. 4 shows a method 70 of managing power in a virtualized mobile platform. The method 70 may be implemented in fixed-functionality hardware using assembly language programming and circuit technology such as ASIC, complementary metal oxide semiconductor (CMOS) or transistor-transistor logic (TTL) technology, in executable software as a set of firmware and/or logic instructions stored in a machine- or computer-readable storage medium of a memory such as random access memory (RAM), read only memory (ROM), programmable ROM (PROM), flash memory, etc., or any combination thereof.

Processing block 72 provides for reading a set of memory mapped registers that are dedicated to power management. As already noted, the registers, which might include one or more status registers, command registers and control registers and could reside on a platform controller hub (PCH) 50 (FIG. 4), processor 44 (FIG. 4), or elsewhere on the platform as appropriate, can contain power management requests from multiple operating systems executing on the platform. A power state may be determined at block 74 based on the currently pending power management requests, and the power state can be applied to the platform at block 76.

Thus, the techniques described herein can provide for an architectural framework for implementing power management decisions in VT-based next generation mobile platforms. For example, the solutions may be able to virtualize power states of power efficient components such as devices, CPUs, chipsets, accelerator blocks across multiple operating systems.

Embodiments of the present invention are applicable for use with all types of semiconductor integrated circuit ("IC") chips. Examples of these IC chips include but are not limited to processors, controllers, chipset components, programmable logic arrays (PLA), memory chips, network chips, systems on chip (SoCs), SSD/NAND controller ASICs, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" is used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
   determining a power state based on a first power management request from a first operating system executing on a mobile platform and a second power management request from a second operating system executing on the mobile platform, wherein the first operating system and one or more components of the mobile platform define a first virtual machine, and the second operating system and one or more components of the mobile platform define a second virtual machine;
   determining a performance state based on the first performance management request from the first operating system and a second performance management request from the second operating system;
   applying the power state and the performance state to the mobile platform,
   wherein the first power management request identifies a first power state and the second power management request identifies a second power state, and determining the power state includes selecting a shallowest power state from the first and second power states.

2. The method of claim 1, further including reading the first and second power management requests from a set of registers that are dedicated to power management.

3. The method of claim 2, wherein the set of registers includes at least one of a status register, a command register and a control register.

4. The method of claim 2, further including mapping the set of registers to a memory space.

5. The method of claim 1, wherein applying the power state to the mobile platform includes placing a hardware block of the mobile platform in a low power mode corresponding to the power state.

6. The method of claim 5, wherein the hardware block includes at least one of a wireless circuit block, a storage circuit block and an imaging circuit block.

7. An apparatus comprising:
virtual machine management logic having a co-processor with a power management unit, the virtual machine management logic to,
determine a power state based on a first power management request from a first operating system to execute on a mobile platform and a second power management request from a second operating system to execute on the mobile platform, wherein the first operating system and one or more components of the mobile platform are to define a first virtual machine, and the second operating system and one or more components of the mobile platform are to define a second virtual machine,
determine a performance state based on a first performance management request from the first operating system and a second performance management request from the second operating system; and
apply the power state and the performance state to the mobile platform,
wherein the first power management request is to identify a first power state and the second power management request is to identify a second power state, and the virtual machine logic is to select a shallowest power state from the first and second power states.

8. The apparatus of claim 7, further including a set of registers that are dedicated to power management, and the power management unit of the virtual machine management logic is to read the first and second power management requests from the set of registers.

9. The apparatus of claim 8, wherein the set of registers includes at least one of a status register, a command register and a control register.

10. The apparatus of claim 9, wherein the virtual machine management logic is to map the set of registers to a memory space.

11. The apparatus of claim 7, wherein the virtual machine management logic is to place a hardware block of the mobile platform in a low power mode that corresponds to the power state.

12. The apparatus of claim 11, wherein the hardware block is to include at least one of a wireless circuit block, a storage circuit block and an imaging circuit block.

13. A system comprising:
a mobile platform to execute a first operating system and a second operating system, wherein the first operating system and one or more components of the mobile platform are to define a first virtual machine, and the second operating system and one or more components of the mobile platform are to define a second virtual machine; and
virtual machine management logic having a co-processor with a power management unit, the virtual machine management logic to,
determine a power state based on a first power management request from the first operating system and a second power management request from the second operating system,
determine a performance state based on a first performance management request from the first operating system and a second performance management request from the second operating system; and
apply the power state and the performance state to the mobile platform,
wherein the first power management request is to identify a first power state and the second power management request is to identify a second power state, and the virtual machine management logic is to select a shallowest power state from the first and second power states.

14. The system of claim 13, further including a set of registers that are dedicated to power management, and the s ower mana ement unit of the virtual machine management logic is to read the first and second power management requests from the set of registers.

15. The system of claim 14, wherein the set of registers includes at least one of a status register, a command register and a control register.

16. The system of claim 15, wherein the virtual machine management logic is to map the set of registers to a memory space.

17. The system of claim 13, wherein the mobile platform includes a hardware block and the virtual machine management logic is to place the hardware block in a low power mode that corresponds to the power state.

18. The system of claim 17, wherein the hardware block includes at least one of a wireless circuit block, a storage circuit block and an imaging circuit block.

19. A computer readable storage medium comprising a set of instructions which, if executed, cause a mobile platform to:
determine a power state based on a first power management request from a first operating system to execute on the mobile platform and a second power management request from a second operating system to execute on the mobile platform, wherein the first operating system and one or more components of the mobile platform are to define a first virtual machine, and the second operating system and one or more components of the mobile platform are to define a second virtual machine;
determine a performance state based on a first performance management request from the first operating system and a second performance management request from the second operating system; and
apply the power state and the performance state to the mobile platform,
wherein the first power management request is to identify a first power state and the second power management request is to identify a second power state, and the instructions, if executed, cause the mobile platform to select a shallowest power state from the first and second power states.

20. The medium of claim 19, wherein the instructions, if executed, cause the mobile platform to read the first and second power management requests from a set of registers that are to be dedicated to power management.

21. The medium of claim 20, wherein the set of registers is to include at least one of a status register, a command register and a control register.

22. The medium of claim 20, wherein the instructions, if executed, cause the mobile platform to map the set of registers to a memory space.

23. The medium of claim 19, wherein the instructions, if executed, cause the mobile platform to place a hardware block of the mobile platform in a low power mode that corresponds to the power state.

24. The medium of claim 23, wherein the hardware block is to include at least one of a wireless circuit block, a storage circuit block and an imaging circuit block.

* * * * *